United States Patent
Acker, Jr.

(10) Patent No.: US 9,051,774 B1
(45) Date of Patent: Jun. 9, 2015

(54) UPPER RAIL INSERT FOR USE IN A CURTAIN-SIDE TRAILER

(71) Applicant: Roland Curtains Inc., Arlington, TX (US)

(72) Inventor: Hermann L. Acker, Jr., Arlington, TX (US)

(73) Assignee: Roland Curtains Inc., Arlington, TX (US)

( * ) Notice: Subject to any disclaimer, the term of this patent is extended or adjusted under 35 U.S.C. 154(b) by 24 days.

(21) Appl. No.: 14/165,054

(22) Filed: Jan. 27, 2014

(51) Int. Cl.
  E06B 9/56 (2006.01)
  E05D 15/06 (2006.01)
  B60J 5/06 (2006.01)

(52) U.S. Cl.
  CPC .............. *E06B 9/56* (2013.01); *E05D 15/0626* (2013.01); *B60J 5/065* (2013.01)

(58) Field of Classification Search
  CPC .............................. B60J 5/065; E05D 15/0626
  USPC ....................................... 160/196.1, 346, 347
  See application file for complete search history.

(56) References Cited

U.S. PATENT DOCUMENTS

| | | | | |
|---|---|---|---|---|
| 4,569,164 A | * | 2/1986 | Dickson | 52/64 |
| 4,633,614 A | * | 1/1987 | Van Weelden | 49/409 |
| 4,785,494 A | * | 11/1988 | Adamski | 16/95 R |
| 4,943,110 A | * | 7/1990 | Pastva | 296/186.2 |
| 7,578,539 B1 | | 8/2009 | Acker, Jr. | |
| 7,653,966 B2 | * | 2/2010 | Quinn et al. | 16/96 R |
| 2010/0077668 A1 | * | 4/2010 | Dries | 49/409 |
| 2010/0237647 A1 | * | 9/2010 | Whitehead et al. | 296/29 |

OTHER PUBLICATIONS

2 Sheets entitled Sliding Systems, Inc.—Curtainside Technology showing a Cantrail—Wear Insert Extrusion.

* cited by examiner

*Primary Examiner* — Blair M Johnson
(74) *Attorney, Agent, or Firm* — Sturm & Fix LLP

(57) ABSTRACT

An upper rail configuration for mounting a wheeled trolley assembly for mounting curtains on a curtain side trailer has removable and replaceable inserts which have a configuration a complementary to the upper rail configuration. A top portion of each insert fits into a slot in the upper rail and the bottom of each insert rests on a shelf of the upper rail. Once worn, these inserts can be replaced in the field at a fraction of the cost of completely new upper rail.

6 Claims, 3 Drawing Sheets

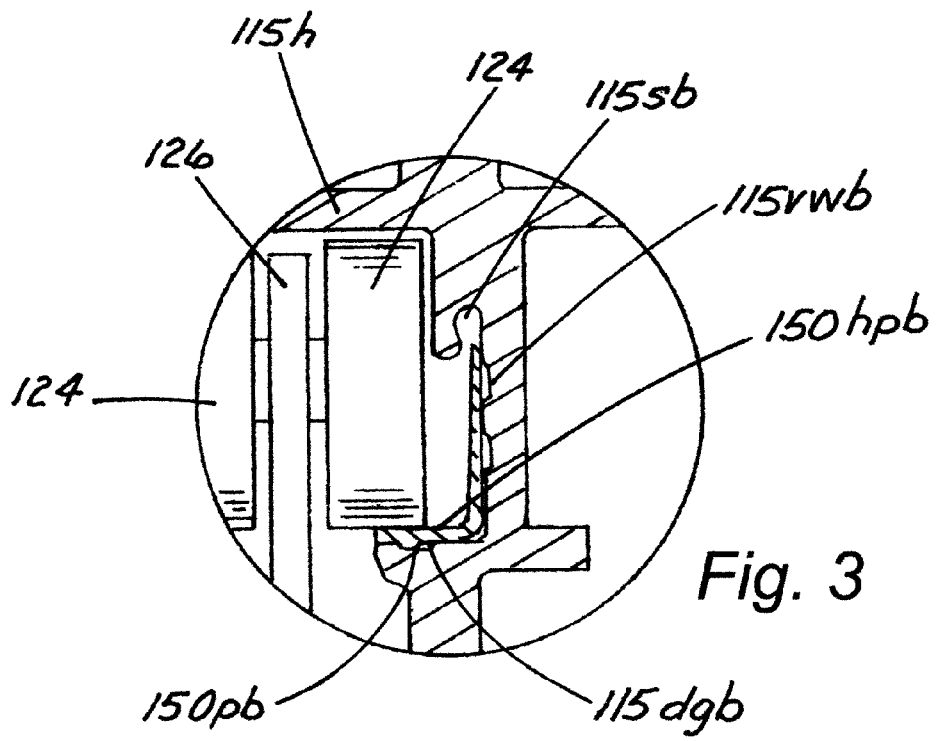
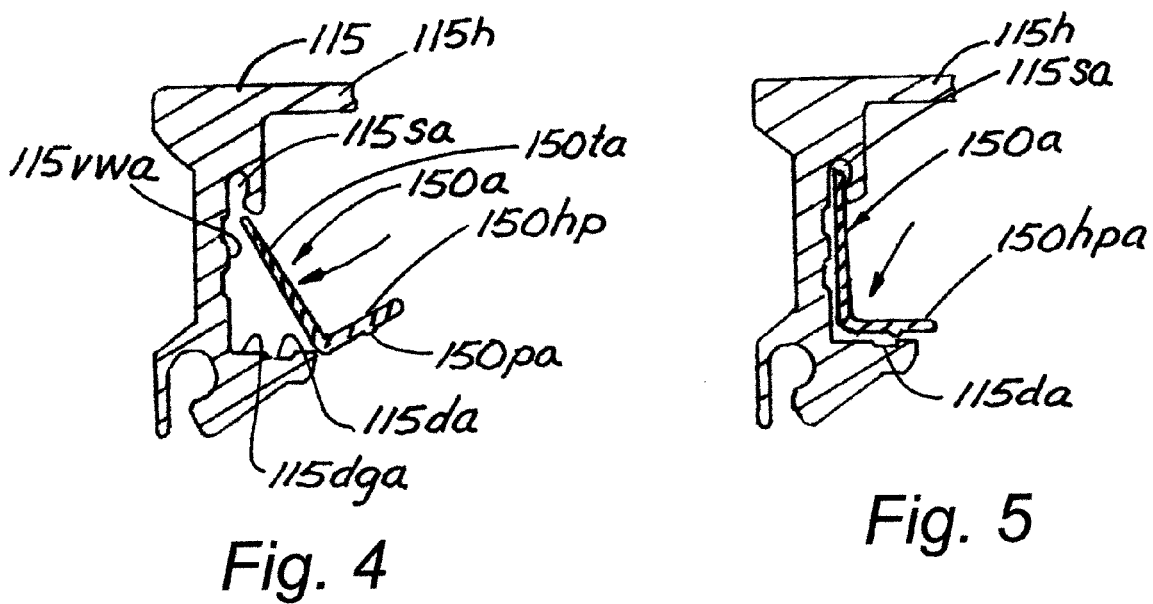
Fig. 3
Fig. 4
Fig. 5

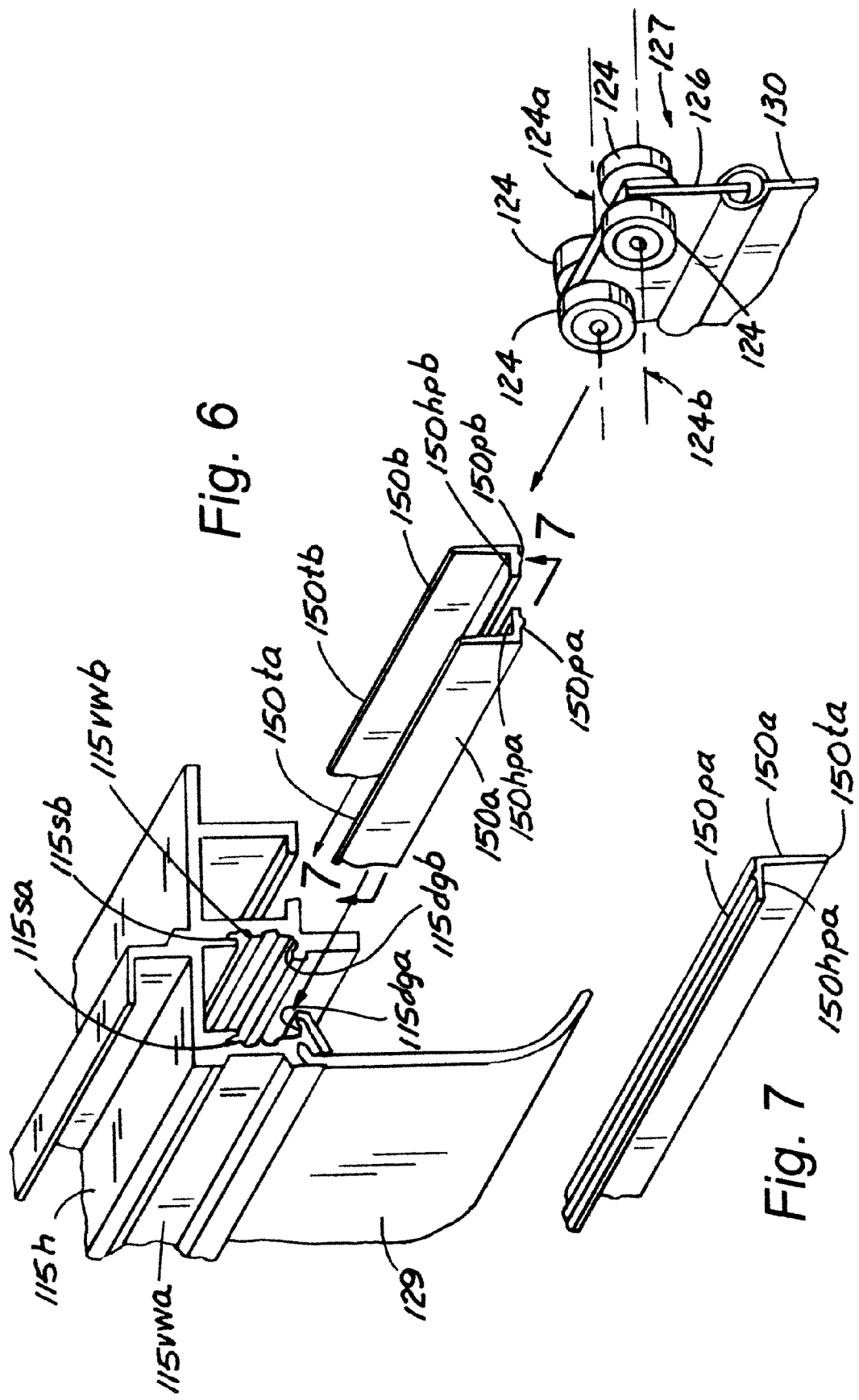

UPPER RAIL INSERT FOR USE IN A CURTAIN-SIDE TRAILER

TECHNICAL FIELD

This invention relates generally to curtain side trailers and more particularly to an upper rail insert for use in a curtain side trailer.

BACKGROUND

Curtains for curtain side trailers are opened and closed by attaching the curtains to a trolley with rollers to a top rail on the trailer. Because these curtains are moved often, eventually the rails upon which the rollers roll become worn and must be replaced or repaired.

One solution to the aforementioned repair process has been to put a replaceable steel flange over the worn surface. These upper rail inserts appear to be held in by the rollers themselves. While this solution works to some extent, shifting of these prior art upper rail inserts will cause them to wear prematurely. Furthermore these upper rail inserts are not easily replaced in the field. Accordingly, there is a need for a better way to hold upper rail inserts in place.

SUMMARY OF THE INVENTION

An upper rail configuration for mounting a wheeled trolley assembly for mounting curtains on a curtain side trailer has removable and replaceable inserts which have a configuration complementary to the upper rail configuration. A top portion of each insert fits into a slot in the upper rail and the bottom of each insert rests on a shelf of the upper rail. A projection on the bottom of each of the upper rail inserts fits into a complementary groove in the shelf to further prevent shifting of the insert with respect to the upper rail. Once worn, the inserts can be replaced in the field at a fraction of the cost of completely new upper rail.

BRIEF DESCRIPTION OF THE DRAWINGS

The above needs are at least partially met through provision of the apparatus described in the following detailed description, particularly when studied in conjunction with the drawings, wherein:

FIG. 3 is an enlarged cross sectional view that is within the circle 3 of FIG. 2;

FIG. 4 is a cross sectional view showing just the left side portion of what is shown in FIG. 2, showing one way in which the insert of the present invention can be positioned just prior to being moved to the installed FIG. 5 position;

FIG. 5 is a cross sectional view like FIG. 4 showing just the left side portion of what is shown in FIG. 2, but showing the installed position of the insert of the present invention after it is moved from the FIG. 4 position;

FIG. 6 is an exploded perspective view showing another way in which the insert of the present invention can be positioned just prior to being moved to the installed position of FIGS. 2 and 3; and FIG. 7 is a perspective view of the insert of FIGS. 2-6 flipped over from the FIG. 6 position to show a projection on the bottom thereof that fits into a groove formed in the upper rail.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The present invention relates to an improvement to a curtain side trailer of the type shown in U.S. Pat. No. 7,578,539 to Acker, which patent is incorporated herein by reference in its entirety. It is to be understood that for the purposes of this invention, the upper rails of curtain side trailers can be the same as those for curtain side truck bodies. Accordingly the claimed invention is intended to cover structures for both curtain side trailers and curtain side truck bodies.

Figure 1:
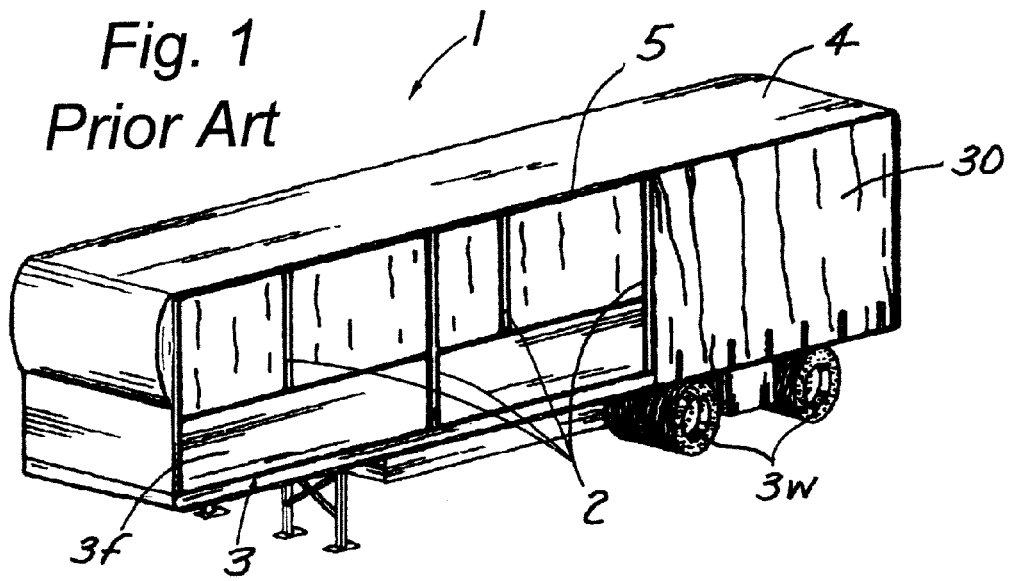
FIG. 1 is a perspective view of a prior art curtain side trailer upon which the present invention can be used.

Referring now to the drawings wherein like numerals designate identical or corresponding parts throughout the several views, FIG. 1 shows a curtain side semi trailer 1 with intermediary pillars 2 that are connected from the floor 3$f$ to the trailer roof 4. The pillars 2 are connected at their upper end to a rail or upper frame 5 and at their lower end to lower frame 3.

Figure 1A:
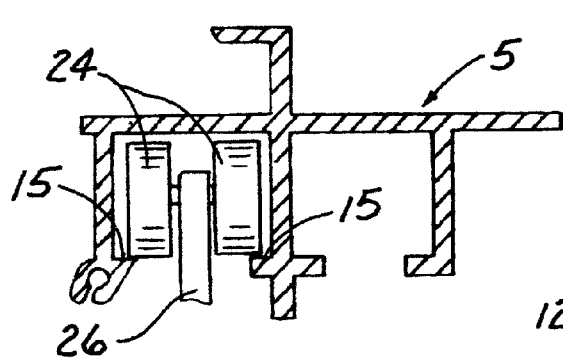
FIG. 1A is a cross sectional view through the upper beam of a prior art curtain side trailer.

FIG. 1A is a cross-section of the upper frame 5 showing rollers 24 rotatably mounted to a curtain bracket 26, the rollers 24 rolling in a track formed by ledges 15 formed on the upper frame 5.

Figure 2:
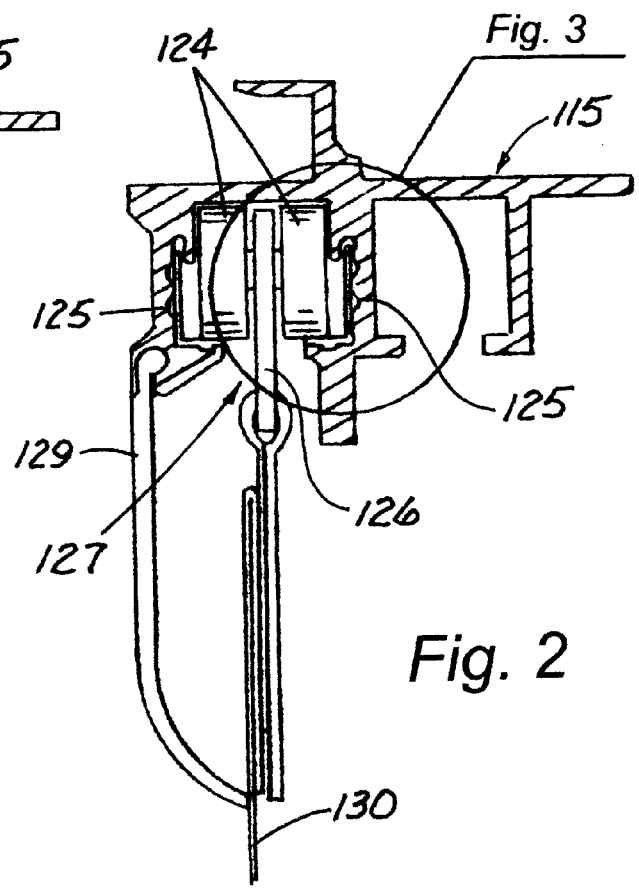
FIG. 2 is a cross sectional view through the upper beam of a prior art curtain side trailer, similar to FIG. 1A, but of the present invention.

Looking now to FIG. 2, a trolley wheel assembly 127 is disposed on the tracks 125 of the upper frame 115 to permit the trolley wheel assembly 127 to move along the tracks 125.

The tracks 125 are formed by first and second removable elongated L-shaped members 150$a$/150$b$ wedged into complementary structure on the upper frame 115 shown best in FIGS. 4-7, which show an upper horizontal wall 115$h$, a first vertical wall 115$vwa$ extending downwardly from the upper horizontal wall and a second vertical wall 115$vwb$ extending downwardly from the upper horizontal wall 115$h$, the second vertical wall 115$vwb$ being spaced from the first vertical wall 115$vwa$.

A first ledge 115$dga$ disposed on the first vertical wall 115$vwa$ is spaced a first distance below the upper horizontal wall 115$h$, the first ledge 115$dga$ extending towards the second vertical wall 115$vwb$, a first slot 115$da$ disposed in the first vertical wall 115$vwa$ above the first ledge 115$dga$.

A second ledge 115$dgb$ is disposed on the second vertical wall 115$vwb$ spaced by said first distance below the upper horizontal wall 115$h$, the second ledge 115$dgb$ extending towards the first vertical wall 115$vwa$. A second slot 115$db$ disposed in the second vertical wall 115$vwb$ above the second ledge 115$dgb$.

A first removable elongated L-shaped member 150a has a top portion 150ta disposed in the first slot 115da of the first vertical wall 115vwa and a lower horizontal portion 150hpa resting on an upper portion 115dga of the first ledge 115dga.

The second removable elongated L-shaped member 150b has a top portion 150tb disposed in the second slot 115sb of the second vertical wall 115vwb and a lower horizontal portion 150hpb resting on an upper portion of the second ledge 115dgb. The elongated L-shaped members 150a/150b are preferably formed of anodized (hardened) aluminum to dramatically extend the life of the upper frame aluminum rails 115. Once worn, they can be replaced in the field at a fraction of the cost of completely new upper rail.

A curtain bracket 126 is disposed between the first and second L-shaped members 150a/150b and the curtain bracket 126 has two rollers 124 (FIG. 6) rotatably attached to the curtain bracket 126 about a first axis 124a and two more rollers 124 (FIG. 6) rotatably attached to the curtain bracket 126 about a second axis 124b. The left-most roller shown in FIGS. 2 and 6 are disposed on top of the lower horizontal portion 150hpa of the first removable elongated L-shaped member 150a and disposed below the upper horizontal wall 115h. The other two rollers 124, on the right hand side as viewed in FIGS. 2 and 6, are rotatably attached to the curtain bracket 126. These other two rollers 124 are disposed on top of the lower horizontal portion 150hpb of the second removable elongated L-shaped member 150b and disposed below the upper horizontal wall 115h.

A first depression 115da is disposed in an upper surface of the first ledge 115dga and a first projection 115pa projects from the bottom of the lower horizontal portion 115hpa of the first removable elongated L-shaped member 115a extending into the first depression 115da (FIG. 4) in the upper surface of the first ledge 115dga.

A second depression (like 115da) is disposed in an upper surface of the second ledge 115dgb. A second projection 115pb projects from the bottom of the lower horizontal portion 115hpb of the second removable elongated L-shaped member 115b, extending into the first depression (FIG. 6) in the upper surface of the second ledge 115dgb.

In operation, one way to install the first and second removable elongated L-shaped members 150a/150b is shown in FIG. 6 by sliding the first and second removable elongated L-shaped members 150a/150b in the direction of the arrows in FIG. 6. Then the trolley assembly 127 is rolled into place by moving the trolley assembly 127 in the direction of the arrow shown in FIG. 6. When the first and second removable elongated L-shaped members 150a/150b become too worn, they can easily be replaced by reversing this process to remove them and then inserting new first and second removable elongated L-shaped members 150a/150b.

An alternate way of installing the first and second removable elongated L-shaped members 150a/150b is shown in FIGS. 4 and 5, by first placing the first removable elongated L-shaped members 150a in a position so the top 150ta can be moved into the slot 115sa and then pivoting the member 150 from the FIG. 4 to the FIG. 5 position so that the projection 150pa fits into the depression/groove 115da in ledge 115dga. Of course the procedure is essentially the same for installing the second removable elongated L-shaped member 150b in place on the other side. And removal of the first and second removable elongated L-shaped members 150a/150b is to essentially reverse the process, going first from the FIG. 5 position of the first removable elongated L-shaped members 150a to the FIG. 4 position of the first removable elongated L-shaped members 150a.

FIGS. 2 and 6 show an optional curtain seal 129 which is typically made of a plastic elastomeric material.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. In an apparatus comprising a lower frame; wheels operatively attached to the frame for permitting the lower frame to move over a surface of a road; a floor attached to the lower frame; an upper frame operatively attached to the lower frame; a track disposed on the upper frame; a roof operatively attached to the upper frame; a curtain operatively attached to the upper and lower frame for selectively providing a barrier to access to the floor in a first position of the curtain and providing access to the floor in another position of the curtain; a trolley wheel assembly disposed on the track of the upper frame to permit the trolley wheel assembly to move along the track at times, the improvement comprising:

the track having an upper horizontal wall, a first vertical wall extending downwardly from the upper horizontal wall and a second vertical wall extending downwardly from the upper horizontal wall, the second vertical wall being spaced from the first vertical wall;

a first ledge disposed on the first vertical wall spaced a first distance below the upper horizontal wall, the first ledge extending towards the second vertical wall, a first slot disposed in the first vertical wall above the first ledge;

a second ledge disposed on the second vertical wall spaced by said first distance below the upper horizontal wall, the second ledge extending towards the first vertical wall, a second slot disposed in the second vertical wall above the second ledge;

a first removable elongated L-shaped member having a top portion disposed in the first slot of the first vertical wall and a lower horizontal portion resting on an upper portion of the first ledge;

a second removable elongated L-shaped member having a top portion disposed in the second slot of the second vertical wall and a lower horizontal portion resting on an upper portion of the second ledge;

a curtain bracket disposed between the first and second L-shaped members;

a first roller rotatably attached to the curtain bracket about a first axis, the first roller being disposed on top of the lower horizontal portion of the first removable elongated L-shaped member and disposed below the upper horizontal wall; and a second roller rotatably attached to the curtain bracket about the first axis, the second roller being disposed on top of the lower horizontal portion of the second removable elongated L-shaped member and disposed below the upper horizontal wall.

2. The apparatus of claim 1, further comprising a first depression in an upper surface of the first ledge and a first projection on the bottom of the lower horizontal portion of the first removable elongated L-shaped member extending into the first depression in the upper surface of the first ledge.

3. The apparatus of claim 2, further comprising a second depression in an upper surface of the second ledge and a second projection on the bottom of the lower horizontal portion of the second removable elongated L-shaped member extending into the second depression on the upper surface of the second ledge.

4. The apparatus of claim 1 wherein the first removable elongated L-shaped member is hardened aluminum.

5. The apparatus of claim 1 wherein the first and second removable elongated L-shaped members are constructed of hardened aluminum.

6. The apparatus of claim 1 wherein a curtain is attached to the curtain bracket.

\* \* \* \* \*